(12) United States Patent
Blanchon et al.

(10) Patent No.: US 8,386,158 B2
(45) Date of Patent: Feb. 26, 2013

(54) METHOD AND SYSTEM FOR ASSISTING IN THE MANAGEMENT OF THE RELATIVE SPACING BETWEEN AIRCRAFT

(75) Inventors: Xavier Blanchon, Toulouse (FR); François Coulmeau, Seilh (FR); Manuel Gutierrez-Castaneda, Toulouse (FR)

(73) Assignee: Thales, Neuilly sur Seine (FR)

( * ) Notice: Subject to any disclaimer, the term of this patent is extended or adjusted under 35 U.S.C. 154(b) by 623 days.

(21) Appl. No.: 12/632,562

(22) Filed: Dec. 7, 2009

(65) Prior Publication Data

US 2010/0152996 A1 Jun. 17, 2010

(30) Foreign Application Priority Data

Dec. 12, 2008 (FR) ...................... 08 07000

(51) Int. Cl.
*G06F 19/00* (2011.01)
(52) U.S. Cl. .................. 701/120; 701/3; 701/4; 701/13; 701/301; 340/903; 340/439
(58) Field of Classification Search .................. 701/3, 4, 701/13, 14, 15, 16, 120, 301; 340/903, 438, 340/439
See application file for complete search history.

(56) References Cited

U.S. PATENT DOCUMENTS

| | | | |
|---|---|---|---|
| 6,271,768 B1 * | 8/2001 | Frazier et al. | 340/961 |
| 6,278,965 B1 * | 8/2001 | Glass et al. | 703/22 |
| 6,311,108 B1 * | 10/2001 | Ammar et al. | 701/16 |
| 6,477,449 B1 * | 11/2002 | Conner et al. | 701/4 |
| 6,718,236 B1 | 4/2004 | Hammer et al. | |
| 2002/0183900 A1 | 12/2002 | Sainthuile | |
| 2005/0165516 A1 | 7/2005 | Haissig et al. | |
| 2008/0306638 A1 | 12/2008 | Gutierrez-Castaneda et al. | |
| 2008/0312779 A1 | 12/2008 | Sacle et al. | |
| 2009/0177342 A1 | 7/2009 | Gutierrez-Castaneda | |
| 2009/0201197 A1 | 8/2009 | Coulmeau et al. | |

FOREIGN PATENT DOCUMENTS

| | | |
|---|---|---|
| FR | 2816091 A1 | 5/2002 |
| FR | 2894056 A1 | 6/2007 |
| WO | 2007016905 A1 | 2/2007 |

* cited by examiner

*Primary Examiner* — Gertrude Arthur Jeanglaude
(74) *Attorney, Agent, or Firm* — Stroock & Stroock & Lavan LLP

(57) ABSTRACT

A method for providing for the optimized regulation of the relative spacing between aircraft is disclosed. This method can be implemented by a system whose physical architecture can rely mainly on existing computers on board most current aircraft. The method includes a main step of determining the changing trend of the relative spacing, in distance or in time, between a target aircraft (C) and a following aircraft (S).

13 Claims, 3 Drawing Sheets

METHOD AND SYSTEM FOR ASSISTING IN THE MANAGEMENT OF THE RELATIVE SPACING BETWEEN AIRCRAFT

CROSS REFERENCE TO RELATED APPLICATIONS

The present application claims priority to French Patent Application Serial No. 08 07000, filed Dec. 12, 2008, the contents of which is hereby incorporated by reference in its entirety.

TECHNICAL FIELD

The present invention relates to the field of the management of civilian aircraft flights, more specifically the management of the relative spacing between aircraft. Said management of the relative spacing between aircraft is known by the acronym ASAS, which stands for "Airborne Separation Assurance System".

BACKGROUND OF THE INVENTION

The required relative spacing between aircraft can be expressed in distance or in time. It is conventionally 90 seconds in the first case, and 3 nautical miles in the second. For some years now, the increase in air traffic, and the workload of the air traffic controllers evolving therefrom, has led to the consideration, in particular in the approach phase, of delegating responsibility for the management of the relative spacing between aircraft to the aircraft themselves and to their crews, whereas this responsibility at the moment is incumbent on air traffic control. Because of this, a number of technologies have been developed, enabling the aircraft to know the surrounding operational situation concerning them. These current technologies generally rely on the operation of equipment already installed in most aircraft: the collision avoidance system, known by the acronym TCAS which stands for "Traffic Collision Avoidance System", coupled with an S mode transponder, also present on the current aircraft.

In practice, currently, the aircraft already transmit their position, their speed, their altitude, so that all the aircraft nearby can know their mutual positions and attitudes. Thus, devices aiming to couple the TCAS with the automatic pilot of an aircraft have been developed. However, they can be used only to control the speed of the following aircraft reactively. They cannot be used to control automatically the relative spacing between the aircraft. In practice, in these devices, the TCAS, in its capacity as standalone computer or computer integrated with other functional modules in an ISS, an acronym standing for "Integrated Surveillance System", fulfils a primary function of surveillance of the surrounding traffic, a function commonly designated as "Safety Net". The objective is then to transmit sound alerts and vertical movement setpoints when a conflict with another aircraft is detected.

For this, the TCAS systems, decoupled from the navigation systems, periodically compare the estimation of the movement of the aircraft relative to the surrounding aircraft.

Generally, the current aircraft, in the approach phase, follow the setpoints given by the air traffic controllers, following procedures of the "Remain Behind" type, consisting for the following aircraft in following a target aircraft at a given distance or with a given time spacing, or of the "Merge Behind" type, consisting for the following aircraft in reaching a point of convergence with a given distance or a given time spacing from the target aircraft.

In this context, studies are being conducted by official organizations with the aim of guaranteeing the safety of possible future ASAS manoeuvres managed on board the aircraft.

To this end, the invention proposes a method and a system making it possible to improve the safety and comfort of the flight during ASAS manoeuvres, the responsibility for which is delegated by air traffic control to the crew of an aircraft.

Recently, methods have been developed in order to favour having the management of the relative spacing between aircraft taken over by onboard systems implemented by the crew. For example, the patents FR2816091 and FR2894056 disclose methods aiming to study the trend of the relative spacing between a target aircraft (or master or leader) and the following aircraft (or slave). In both cases, the following aircraft analyses the data transmitted by the target aircraft, generally via a TCAS system, to communicate to its environment its position, it speed, its heading for example. The following aircraft, equipped with means for acquiring this information, deduces therefrom the trend of the relative spacing separating it from the target aircraft. However, these known methods are either purely reactive, such as the method described in FR2816091, which can cause "accordion" phenomena and does not make it possible to optimize the spacing between the target aircraft and the following aircraft, or they require knowledge of the flight plan and above all of the predictive trajectory of the target aircraft, as in the method described in FR2894056, which is not always possible and which, when said predictive trajectory of the target aircraft is available and transmitted to the environment of the target aircraft, requires potentially intensive acquisition processing operations.

The present invention makes it possible to overcome these drawbacks via the method described in Claim 1.

SUMMARY OF THE INVENTION

To this end, the subject of the invention is a method for assisting in the management of the relative spacing between aircraft, implemented in a following aircraft located on an approach trajectory substantially identical to that of a target aircraft preceding it, characterized in that it comprises the following steps:

the collection, at regular time intervals, of information relating to the successive positions of the target aircraft, constituting a first series of the successive positions of the target aircraft associated with the corresponding successive times, the analysis of said first series, consisting in:
calculating the successive values of the relative spacing, in distance or in time, between the following aircraft and the target aircraft and comparing them to a required relative spacing,
constructing a second series comprising the predictive successive relative spacings, at successive times separated by said regular time interval, between the following aircraft and the target aircraft,
determining whether the second series is increasing, which indicates that the relative spacing between the following aircraft and the target aircraft is increasing, whether the second series is decreasing, which indicates that the relative spacing between the following aircraft and the target aircraft is reducing, or whether the second series is constant, which indicates that the relative spacing between the following aircraft and the target aircraft is stable, the determination of a speed setpoint of the following aircraft so as to:
control the relative spacing between the following aircraft and the target aircraft so that it observes the required relative spacing, to within a tolerance.

The second series can be made up of terms, each corresponding, at a given instant at which information relating to the position of the target aircraft is collected, to the difference between the distance traveled by the following aircraft and the distance traveled by the target aircraft over the time interval preceding said given instant.

The second series can be made up of terms, each corresponding, at a given instant at which the information relating to the position of the target aircraft is collected, to the difference between the time of passage of the following aircraft and the time of passage of the target aircraft at the point at which the target aircraft was located at said given instant.

The second series can be made up of terms, each corresponding, at a given instant at which the information relating to the position of the target aircraft is collected, to the distance between the following aircraft and the target aircraft at said given instant.

The second series can be made up of terms, each corresponding, at a given instant at which the information relating to the position of the target aircraft is collected, to the time elapsed between said given instant and the future estimated time of passage of the following aircraft at the position occupied by the target aircraft at said given instant.

Advantageously, the first series can also comprise the speed of the target aircraft associated with the successive positions concerned.

Advantageously, in the first series, there is associated with each successive position of the target aircraft the associated speed of the target aircraft, calculated as being equal to the average speed of the target aircraft over the time interval preceding the position concerned.

In one preferential embodiment of the invention, the control of the relative spacing between the following aircraft and the target aircraft comprises the following steps:
if the current relative spacing between the following aircraft and the target aircraft observes the required spacing, to within the tolerance: the speed setpoint of the following aircraft is equal to the speed of the target aircraft at the next known position of the target aircraft available in the first series;
if the current relative spacing between the following aircraft and the target aircraft is greater than the required relative spacing and:
if the relative spacing between the following aircraft and the target aircraft increases or is stable, the speed setpoint of the following aircraft is the speed of the target aircraft at the next known position augmented by a correction value;
if the relative spacing between the following aircraft and the target aircraft decreases and:
if the relative spacing between the following aircraft and the target aircraft tends to become less than the required relative spacing, the speed setpoint of the following aircraft is the speed of the target aircraft at the next known position;
if the relative spacing between the following aircraft and the target aircraft tends to remain greater than the required spacing, the speed setpoint of the following aircraft is the speed of the target aircraft at the next known position augmented by a correction;

if the current relative spacing between the following aircraft and the target aircraft is less than the required relative spacing and:
if the relative spacing between the following aircraft and the target aircraft decreases or is stable, the speed setpoint of the following aircraft is the speed of the target aircraft at the next known position minus a correction value;
if the relative spacing between the following aircraft and the target aircraft increases and:
if the relative spacing between the following aircraft and the target aircraft tends to become greater than the required relative spacing, the speed setpoint of the following aircraft is the speed of the target aircraft at the next known position;
if the relative spacing between the following aircraft and the target aircraft tends to remain less than the required spacing, the speed setpoint of the following aircraft is the speed of the target aircraft at the next known position minus a correction.

Advantageously, the invention consists of a system for assisting in the management of the flight of an aircraft comprising means making it possible to implement the method in managing the relative spacing between the aircraft described previously.

Advantageously, the system according to the invention comprises:
means for checking that the conditions making it possible to implement the method according to the invention are met, said conditions comprising at least the actual reception of the information relating to the successive positions of the target aircraft,
means for acquiring and storing said information relating to the successive positions of the target aircraft, corresponding to the construction of the first series,
means for generating a flight profile, comprising at least the determination of a speed setpoint, aiming to observe the required relative spacing,
means for checking that the speed setpoint of the following aircraft is likely to allow for the required relative spacing to be observed,
means for interacting with the crew of the aircraft.

Advantageously, the system according to the invention can comprise different operating modes that can be:
"advice only", corresponding to a mode of operation in which the system simply presents to the crew the information relating to the target aircraft that has been collected; in this mode, the crew is responsible for determining the setpoint speed of the following aircraft,
"check relative spacing", corresponding to a mode of operation in which the system additionally performs a check aiming to check whether the speed setpoint determined by the crew makes it possible to ensure observance of the required relative spacing,
"assisted planning", corresponding to a mode of operation in which the system additionally determines the setpoint speed of the following aircraft.

Preferentially, the means for interacting with the crew of the following aircraft consist of a man-machine interface enabling at least said crew to select the target aircraft.

Advantageously, the means for interacting with the crew of the aircraft consist of a man-machine interface enabling at least said crew to select the mode of operation of the system.

BRIEF DESCRIPTION OF THE DRAWINGS

Other characteristics and advantages of the invention will become apparent from the description that follows, given in light of the appended drawings which represent.

DETAILED DESCRIPTION OF THE INVENTION

Figure 1:
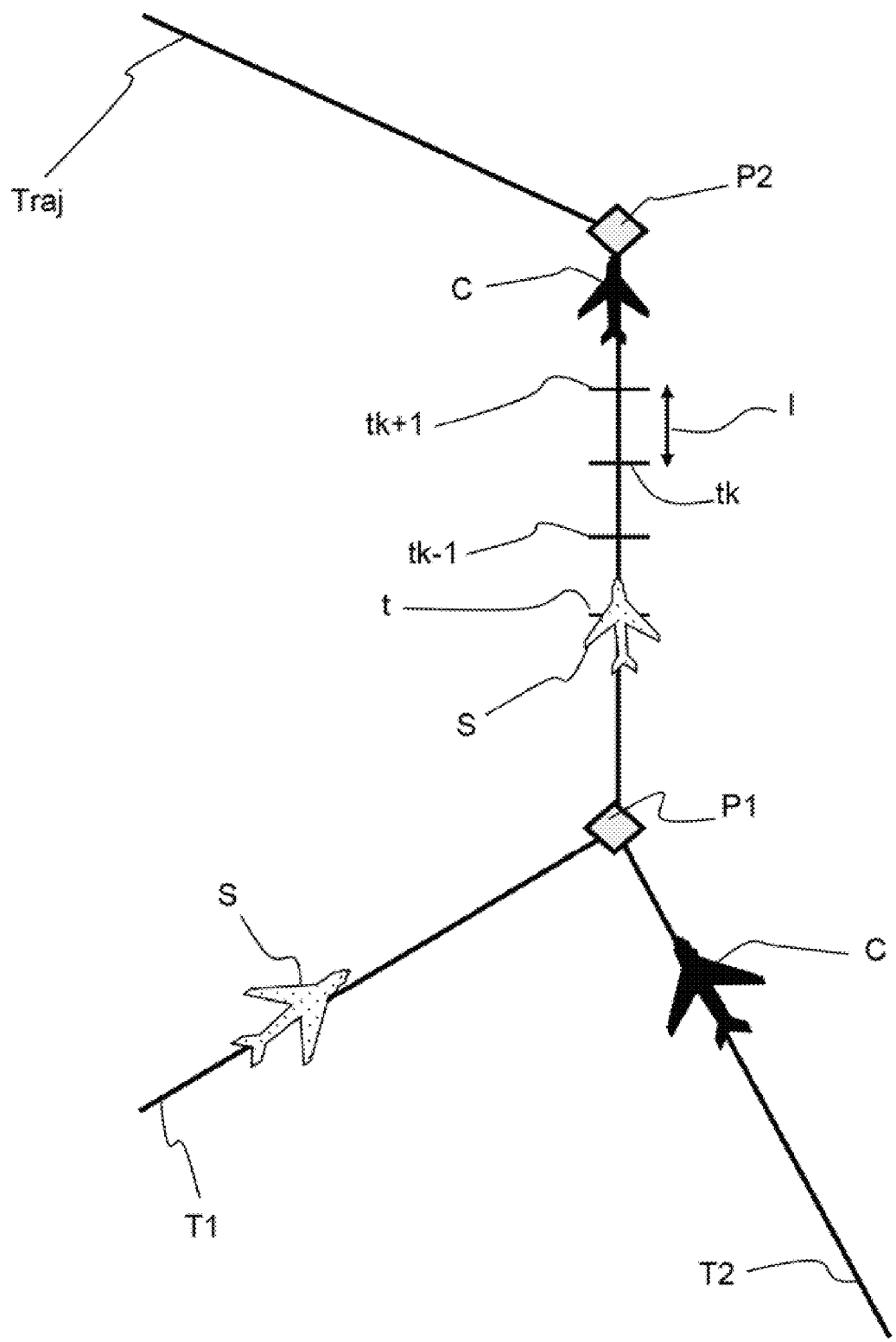
FIG. 1: a diagram for explaining the principle of the method for assisting in the management of the relative spacing between aircraft according to the invention.

FIG. 1 consists of a diagram showing a following aircraft S to which the instruction has been given to follow the target aircraft C at a required relative spacing, in distance or in time. According to the known flight procedures, the target C and following S aircraft converge in that order from their respective trajectories T2 and T1 towards the way point P1 from which they will follow substantially the same trajectory Traj, typically corresponding to an approach phase in order for a landing. The objective of the method according to the invention is to assist the following aircraft S in observing a certain required relative spacing, that may have been demanded by air traffic control, with respect to the target aircraft C. This required relative spacing can be expressed in distance, for example 3 nautical miles, or in time, for example 90 seconds. In the example of FIG. 1, at the instant t, the following aircraft S has just passed the way point P1 whereas the target aircraft C is approaching the way point P2. The target aircraft C communicates, at regular time intervals I, via a transponder, information relating to its position and, where appropriate, to its speed, to its environment. At the instant t, the last position of the target aircraft C known to the following aircraft S is the one that the target aircraft C was occupying at the instant tk. Consequently, the following aircraft S can acquire the information supplied by the target aircraft C and know the successive positions of said target aircraft C at the successive instants tk−1, tk, and immediately tk+1, at which the information relating to the position of the target aircraft C is therefore collected. According to the invention, the acquisition and analysis of this data will make it possible to regulate the speed of the following aircraft S in order to observe the required relative spacing between the target aircraft C and the following aircraft S. To this end, the method for assisting in the management of the relative spacing between aircraft according to the invention recommends constructing and storing on board the following aircraft S a first series comprising at least a list of these successive positions, associated with the corresponding successive instants, of the target aircraft C. This first series can be used to construct other series, according to different variants of the method according to the invention, the analysis of which allows for the optimized management of the relative spacing between the target aircraft C and the following aircraft S.

According to a first embodiment of the method according to the invention, a second series is constructed that can be used to determine the "short term" trend of the changing relative spacing. Said second series comprises the list of the successive relative spacings, from the first relative spacing measured at an initial instant t0, to the last relative spacing measured at the instant tk. If the interest is in a relative spacing in distance, the second series can be made up of elements $ED(ti)=Ds(ti)-Dc(ti)$, in which $ED(ti)$ is the relative spacing in distance between the target aircraft C and the following aircraft S at the instant ti, $Ds(ti)$ is the distance traveled by the following aircraft S over the time interval I preceding the instant ti, and $Dc(ti)$ is the distance traveled by the target aircraft C over the time interval I preceding the instant ti, ti being any instant between t0 and tk, at which information relating to the position of the target aircraft C has been collected. The analysis of the second series $ED(ti)$ gives the trend of the changing relative spacing between the target aircraft C and the following aircraft S. If it is decreasing, the relative spacing reduces, if it is increasing, the relative spacing increases.

According to this embodiment of the method according to the invention, if the interest is in a relative spacing in time, a second series is constructed of which each member $ET(tk)$ corresponds to the difference between the respective times of passage of the target aircraft C and the following aircraft S at the point Xk, Xk being the position of the target aircraft C at the time tk. If the series $ET(tk)$ is decreasing, this indicates that the relative spacing in time between the target aircraft C and the following aircraft S is tending to decrease; conversely, if the series $ET(tk)$ is increasing, this indicates that the relative spacing in time between the target aircraft C and the following aircraft S is tending to increase.

A second embodiment of the method according to the invention consists in constructing a third series with which to determine the "long term" trend of the changing relative spacing between the target aircraft C and the following aircraft S. Two types of third series can be studied. If the interest is in relative spacing in distance, a first type of third series $EDP(ti)=Xi-X(ti)$ is studied, in which Xi is the position of the target aircraft C at the instant ti, $X(ti)$ is the position of the following aircraft S at the instant ti, ti being any instant between t0 and tk, at which information relating to the position of the target aircraft C have been collected. If the interest is in a relative spacing in time, the time at which the following aircraft S will reach the point Xk is estimated, Xk being a known position of the target aircraft C. This time, denoted tsk, is equal to $$\left(\frac{X(tk)-Xk}{Vs}\right),$$

in which $X(tk)$ is the position of the following aircraft S at the instant tk, and Vs is the speed of the following aircraft S at the instant tk. A second type of third series $ETP(ti)=ts(ti)-ti$ can then be defined, in which $ts(ti)$ is the future estimated time of passage of the following aircraft S at the point at which the target aircraft C is located at the instant ti.

As for the first embodiment of the method according to the invention, it is then possible to determine whether the third series is increasing, which indicates that the relative spacing is increasing, if it is decreasing, which indicates that the relative spacing is reducing, or whether it is substantially constant, which indicates that the relative spacing is stable.

Having made it possible to measure the relative spacing between the target aircraft C and the following aircraft S, then to determine the trend of the changing relative spacing, the method according to the invention then makes it possible to act on the speed setpoint of the following aircraft S, in order to regulate the relative spacing between the target aircraft C and the following aircraft S and ensure that the required relative spacing is observed.

The logic of this regulation has already been given above. It firstly involves checking whether the required relative spacing, corresponding to an order given by air traffic control, is observed, to within a tolerance. If it is, the speed setpoint of the following aircraft S is equal to the speed, known or estimated, of the target aircraft C at its next known position.

In the case where the current relative spacing is greater than the required relative spacing to within the tolerance, the trend of change of said relative spacing is determined by studying the second or the third series. If it is increasing or is stable, the speed setpoint of the following aircraft S is the speed of the target aircraft C, known or estimated, at its next known position, augmented by a correction that can be proportional to the difference, in position, in distance, or in time, between the target aircraft C and the following aircraft S. If the relative spacing is reducing and tending to become less than the required relative spacing, the speed setpoint of the following aircraft S is equal to the speed, known or estimated, of the target aircraft C at its next known position. If it is reducing but tending to remain greater than the required relative spacing, the speed setpoint of the following aircraft S is the speed of the target aircraft C, known or estimated, at its next known position, augmented by a correction that can be proportional to the difference, in position, in distance, or in time, between the target aircraft C and the following aircraft S.

In the case where the current relative spacing is less than the required relative spacing, to within the tolerance, the trend of change of said relative spacing is determined by studying the second or the third series. If it is reducing or is stable, the speed setpoint of the following aircraft S is the speed of the target aircraft C, known or estimated, at its next known position, minus a correction that can be proportional to the difference, in position, in distance or in time, between the target aircraft C and the following aircraft S. If the relative spacing is increasing and tending to become greater than the required relative spacing, the speed setpoint of the following aircraft S is equal to the speed, known or estimated, of the target aircraft C at its next known position. If it is increasing but tending to remain less than the required relative spacing, the speed setpoint of the following aircraft S is the speed of the target aircraft C, known or estimated, at its next known position, minus a correction that can be proportional to the difference, in position, in distance or in time, between the target aircraft C and the following aircraft S.

The regulation of the speed setpoint of the following aircraft S in order to guarantee that the required relative spacing is observed is tantamount to performing a regulation loop of said speed setpoint, of PD type, standing for Proportional Derivative, or of PID type, standing for Proportional Integral Derivative, making it possible to take into account both the "short term" and "long term" trends of the changing relative spacing for the calculation of the possible correction to be taken into account for the speed setpoint of the following aircraft S.

Figure 2:
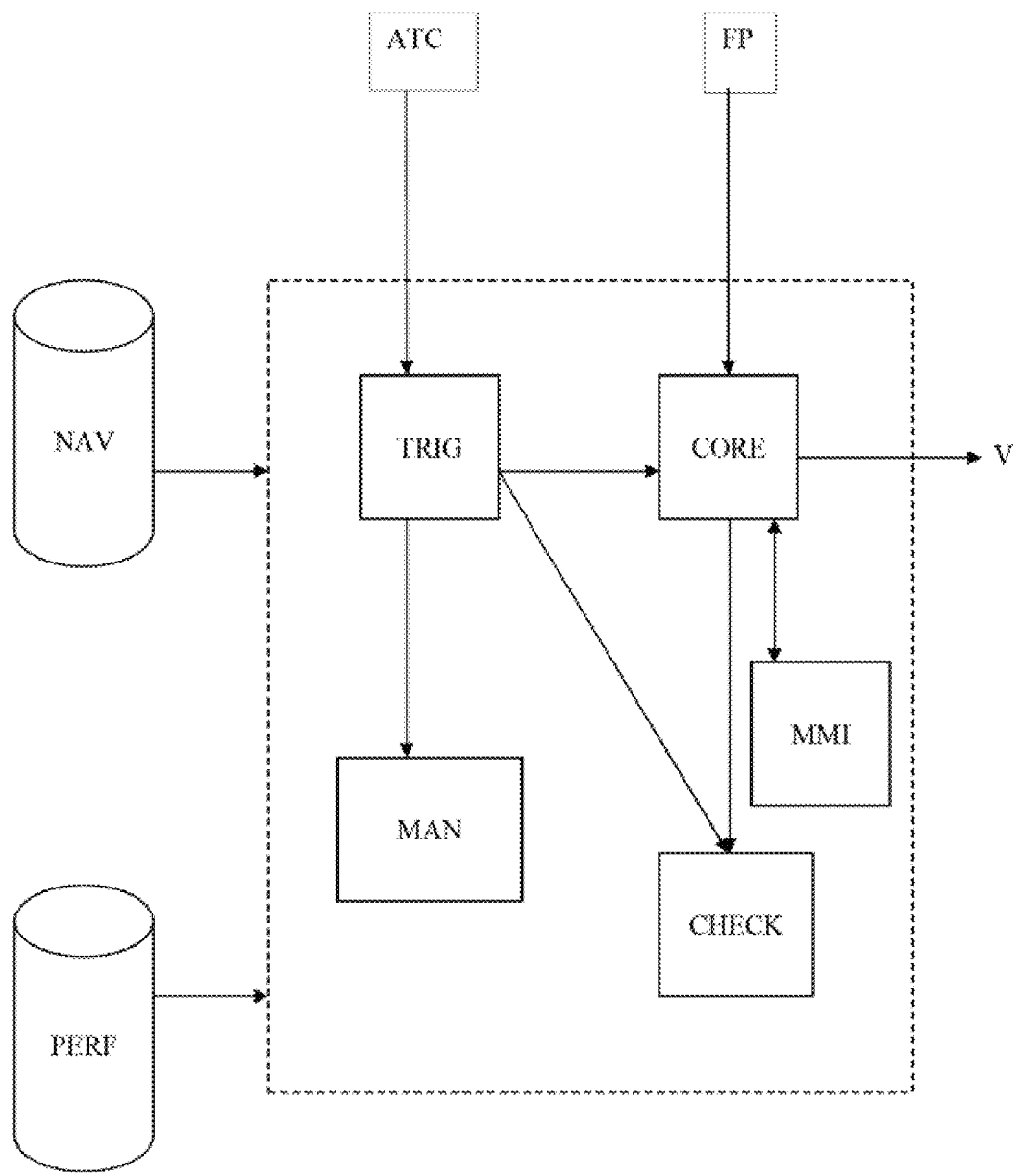
FIG. 2: a block diagram illustrating the structure of the system for implementing the method according to the invention.

FIG. 2 shows the diagram of the possible architecture of a system with which to implement the method according to the invention. Firstly, the system according to the invention comprises means TRIG making it possible to check that the technical conditions on board the following aircraft S are met to allow the execution of a clearance order transmitted by air traffic control ATC, said clearance order typically consisting in the need to observe a required relative spacing relative to a target aircraft C. Among these conditions there is at least the fact of actually receiving information originating from the target aircraft C.

The system according to the invention comprises means MAN making it possible to acquire and store the successive positions of the target aircraft C associated with the successive instants separated by a regular time interval I, and, if necessary, the speed of the target aircraft C at each of these successive instants.

Moreover, to allow for the optimal implementation of the method according to the invention, the system can access a navigation database NAV, a performance database PERF listing the aerodynamic capabilities of the following aircraft S, and the flight plan FP of the following aircraft S. Thus, the CORE function can establish the ideal speed setpoint, allowing for optimized control of the relative spacing between the target aircraft C and the following aircraft S.

Finally, the CHECK function checks the feasibility of the manoeuvre calculated previously.

The man-machine interface MMI also enables the crew to activate or deactivate the functions of the system according to the invention. The crew can also use the man-machine interface MMI to designate the target aircraft C to be taken into account. Via the man-machine interface MMI, the crew can also choose the operating mode of the system, from, for example, the following three operating modes:

According to a first operating mode, entitled "Advice only", the system according to the invention is limited to evaluating and presenting to the crew the situation of the target aircraft C, with its successive positions associated with the stored successive instants. In this first embodiment, the crew is then entirely responsible for determining the setpoint speed of the following aircraft S.

According to a second operating mode, called "Check relative spacing", the system can, in addition, once the crew has determined the setpoint speed of the following aircraft S, check the relevance of this choice.

Finally, a third complete operating mode, qualified as "Assisted scheduling", enables the system according to the invention to propose a speed profile aiming to observe the clearance setpoint entrusted by air traffic control ATC. The crew may choose simply to select, via the man-machine interface MMI, the target aircraft C to be taken into account, whereas the system is responsible for the speed setpoint of the following aircraft S.

Figure 3:
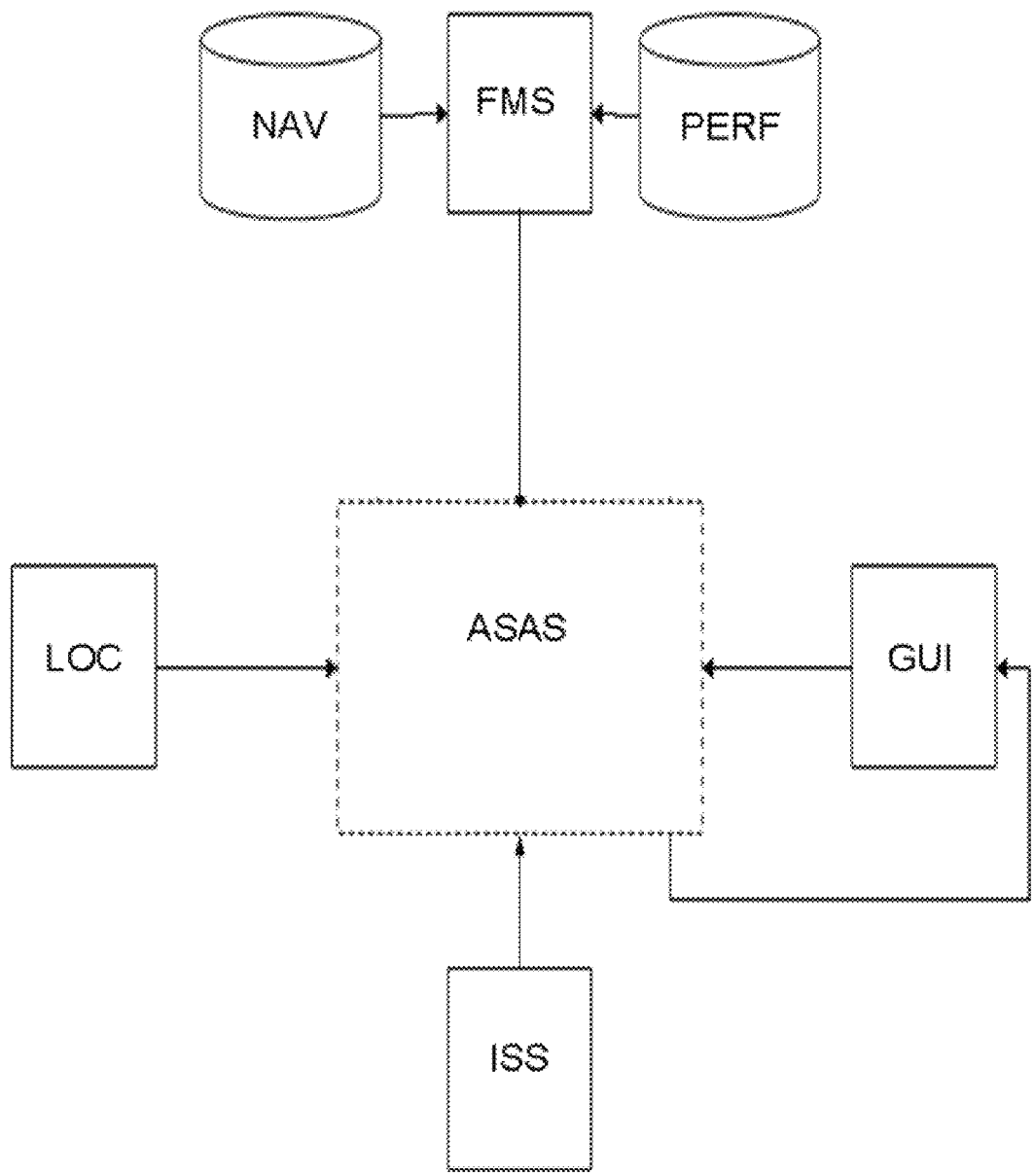
FIG. 3: a block diagram showing an example of the physical architecture of a system according to the invention.

FIG. 3 presents an exemplary physical architecture with which to implement the invention on the basis of a set of computers existing on board current aircraft. The method for assisting in the management of the relative spacing between aircraft according to the invention, ASAS, relies simultaneously on the operation, on board the following aircraft S:

of the flight management system FMS, allowing access to the flight plan FP, to the navigation database NAV and to the aerodynamic performance database PERF of the aircraft, of the surveillance system ISS, allowing knowledge of the information relating to the target aircraft C, of the guidance module GUI of the following aircraft S.

In practice, the flight management FMS and surveillance ISS (Integrated Surveillance System) systems, and the guidance module GUI are installed on most current civilian aircraft. Now, referring to FIG. 2 described previously, it can be seen that the CORE function can be taken over by the flight management system FMS, as can the CHECK function. The TRIG means making it possible to check that the technical conditions on board the following aircraft S are met to allow execution of a clearance order transmitted by air traffic control can rely on the operation of the surveillance system ISS, as can the MAN function for acquiring and storing information relating to the target aircraft C.

Finally, the man-machine interface MMI can operate the corresponding interface means already implemented in the surveillance system ISS.

Thus, to sum up, the invention presents a method of allowing for the optimized regulation of the relative spacing between aircraft. This method can be implemented by a system whose physical architecture can rely essentially on computers that

The invention claimed is:

1. A method for assisting in management of relative spacing between aircraft, implemented in a following aircraft located on an approach trajectory substantially identical to that of a target aircraft preceding the following aircraft, the method comprising the following steps:
collection, at successive time intervals, of information relating to successive positions of the target aircraft, constituting a first series of the successive positions of the target aircraft associated with corresponding successive times,
analysis of said first series, comprising:
calculating successive values of the relative spacing, in distance or in time, between the following aircraft and the target aircraft and comparing the successive values of the relative spacing to a required relative spacing,
constructing a second series comprising predictive successive relative spacings, at successive times separated by said regular time interval, between the following aircraft and the target aircraft, and
determining whether the second series is increasing, which indicates that the relative spacing between the following aircraft and the target aircraft is increasing, whether the second series is decreasing, which indicates that the relative spacing between the following aircraft and the target aircraft is reducing, or whether the second series is constant, which indicates that the relative spacing between the following aircraft and the target aircraft is stable, and
determination of a speed setpoint of the following aircraft so as to:
control the relative spacing between the following aircraft and the target aircraft so that the relative spacing between the following aircraft and the target aircraft observes the required relative spacing, to within a tolerance.

2. The method according to claim 1, wherein said second series is made up of terms, each corresponding, at a given instant at which information relating to a position of the target aircraft is collected, to a difference between a distance travelled by the following aircraft and a distance travelled by the target aircraft over a time interval preceding said given instant.

3. The method according to claim 1, wherein said second series is made up of terms, each corresponding, at a given instant at which information relating to a position of the target aircraft is collected, to a difference between a time of passage of the following aircraft and a time of passage of the target aircraft at a location at which the target aircraft was located at said given instant.

4. The method according to claim 1, wherein said second series is made up of terms, each corresponding, at a given instant at which information relating to a position of the target aircraft is collected, to a distance between the following aircraft and the target aircraft at said given instant.

5. The method according to claim 1, wherein said second series is made up of terms, each corresponding, at a given instant at which information relating to a position of the target aircraft is collected, to time elapsed between said given instant and a future estimated time of passage of the following aircraft at the position occupied by the target aircraft at said given instant.

6. The method according to claim 1, wherein said first series further comprises a speed of the target aircraft associated with successive positions.

7. The method according claim 1, wherein, in the first series, there is associated with each successive position of the target aircraft an associated speed of the target aircraft, calculated as being equal to an average speed of the target aircraft over the time interval preceding an associated position.

8. The method according to claim 6, wherein said control of the relative spacing between the following aircraft and the target aircraft further comprises the following steps:
if a current relative spacing between the following aircraft and the target aircraft observes the requires spacing, to within the tolerance: the speed setpoint of the following aircraft is equal to a speed of the target aircraft at a next known position of the target aircraft available in the first series;
if the current relative spacing between the following aircraft and the target aircraft is greater than the required relative spacing and:
if the current relative spacing between the following aircraft and the target aircraft increases or is stable, the speed setpoint of the following aircraft is the speed of the target aircraft at the next known position augmented by a correction value;
if the relative spacing between the following aircraft and the target aircraft decreases and:
if the current relative spacing between the following aircraft and the target aircraft tends to become less than the required relative spacing, the speed setpoint of the following aircraft is the speed of the target aircraft at the next known position;
if the current relative spacing between the following aircraft and the target aircraft tends to remain greater than the required spacing, the speed setpoint of the following aircraft is the speed of the target aircraft at the next known position augmented by a correction; and
if the current relative spacing between the following aircraft and the target aircraft is less than the required relative spacing and:
if the current relative spacing between the following aircraft and the target aircraft decreases or is stable, the speed setpoint of the following aircraft is the speed of the target aircraft at the next known position minus a correction value;
if the current relative spacing between the following aircraft and the target aircraft increases and:
if the current relative spacing between the following aircraft and the target aircraft tends to become greater than the required relative spacing, the speed setpoint of the following aircraft is the speed of the target aircraft at the next known position;
if the current relative spacing between the following aircraft and the target aircraft tends to remain less than the required spacing, the speed setpoint of the following aircraft is the speed of the target aircraft at the next known position minus a correction.

9. A system for assisting in the management of the flight of an aircraft, comprising means configured to implement the method in the management of the relative spacing between the aircraft according to claim 1.

10. The system according to claim 9, comprising at least a computing system configured to perform the following steps:
verifying that at least reception of information relating to the successive positions of the target aircraft correspond to predetermined conditions,
acquiring and storing said information relating to the successive positions of the target aircraft, corresponding to a construction of the first series, generating a flight profile, comprising at least determination of a speed setpoint of the following aircraft to observe the required relative spacing, checking that the speed setpoint of the following aircraft is likely to allow for the required relative spacing to be observed, and interacting with crew of the aircraft.

11. The system according to claim 10, having a plurality of operating modes, including:

"advice only", corresponding to a mode of operation in which the system presents to the crew of the aircraft information relating to the target aircraft that has been collected; wherein in this mode, the crew of the aircraft is responsible for determining the setpoint speed of the following aircraft, "check relative spacing", corresponding to a mode of operation in which the system additionally performs a check to determine if the speed setpoint of the following aircraft provided by the crew of the aircraft is satisfactory to ensure observance of the required relative spacing, and "assisted planning", corresponding to a mode of operation in which the system additionally determines the setpoint speed of the following aircraft.

12. The system according to claim 10, wherein interacting with the crew of the aircraft comprises enabling at least said crew of the aircraft to select the target aircraft.

13. The system according to claim 11, wherein interacting with the crew of the aircraft comprises enabling at least said crew of the aircraft to select at least one of the operating modes of the system.

* * * * *